Figure 1:
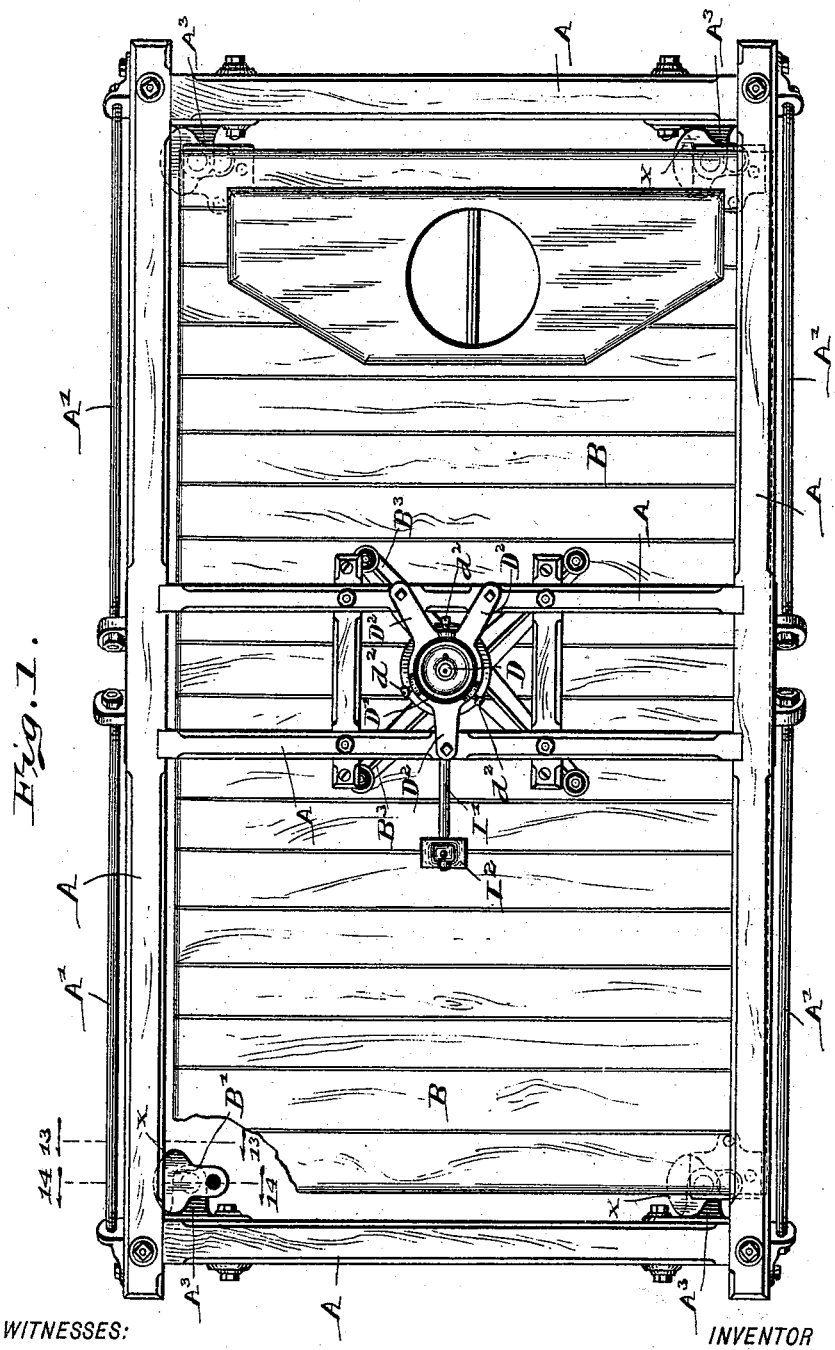

(No Model.) 6 Sheets—Sheet 1.

J. WARRINGTON.
BALANCING MECHANISM.

No. 551,149. Patented Dec. 10, 1895.

WITNESSES: INVENTOR
Jesse Warrington,
BY Chester P. Bradford,
ATTORNEY.

(No Model.) 6 Sheets—Sheet 2.
J. WARRINGTON.
BALANCING MECHANISM.
No. 551,149. Patented Dec. 10, 1895.
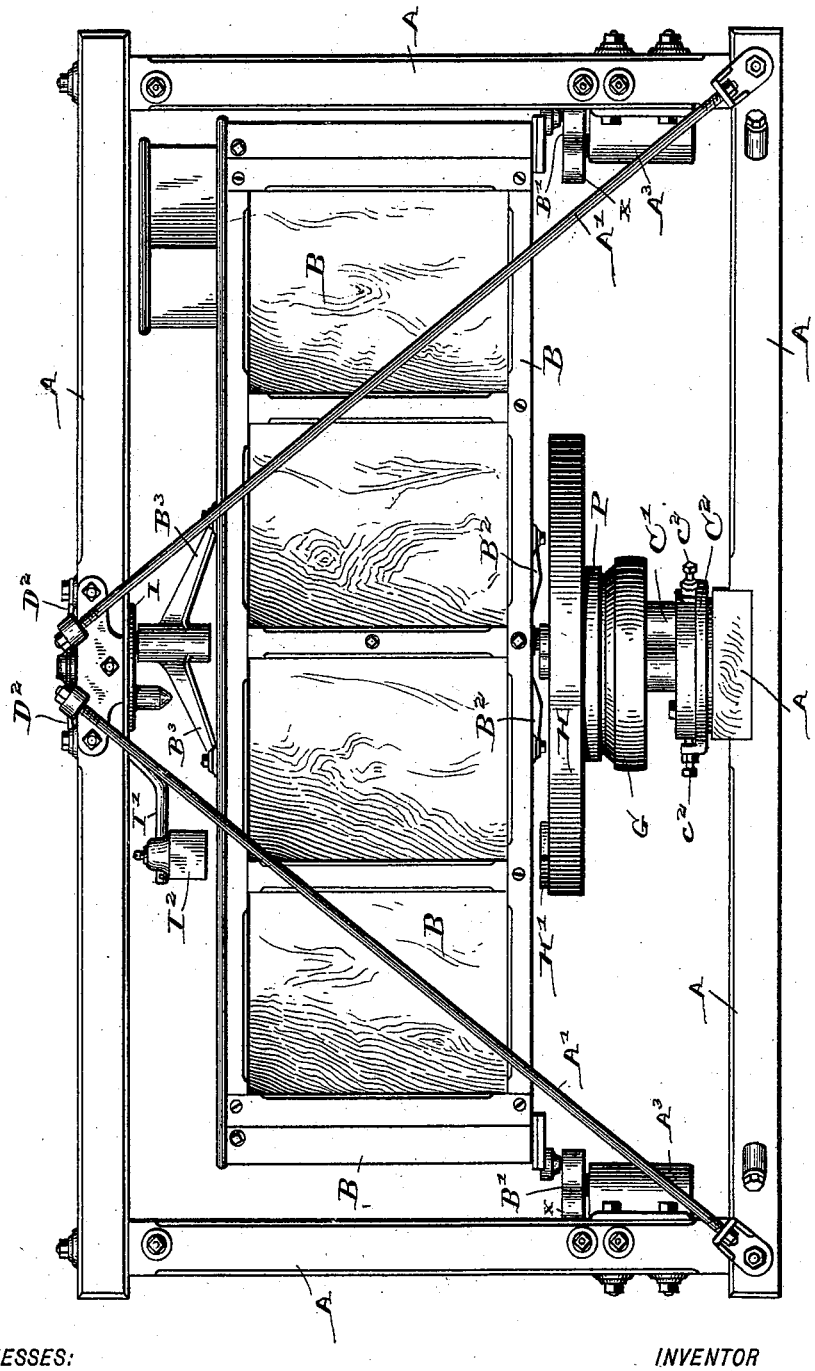
WITNESSES: INVENTOR
Jesse Warrington,
BY Chester L. Bradford,
ATTORNEY.

(No Model.) 6 Sheets—Sheet 3.
J. WARRINGTON.
BALANCING MECHANISM.
No. 551,149. Patented Dec. 10, 1895.
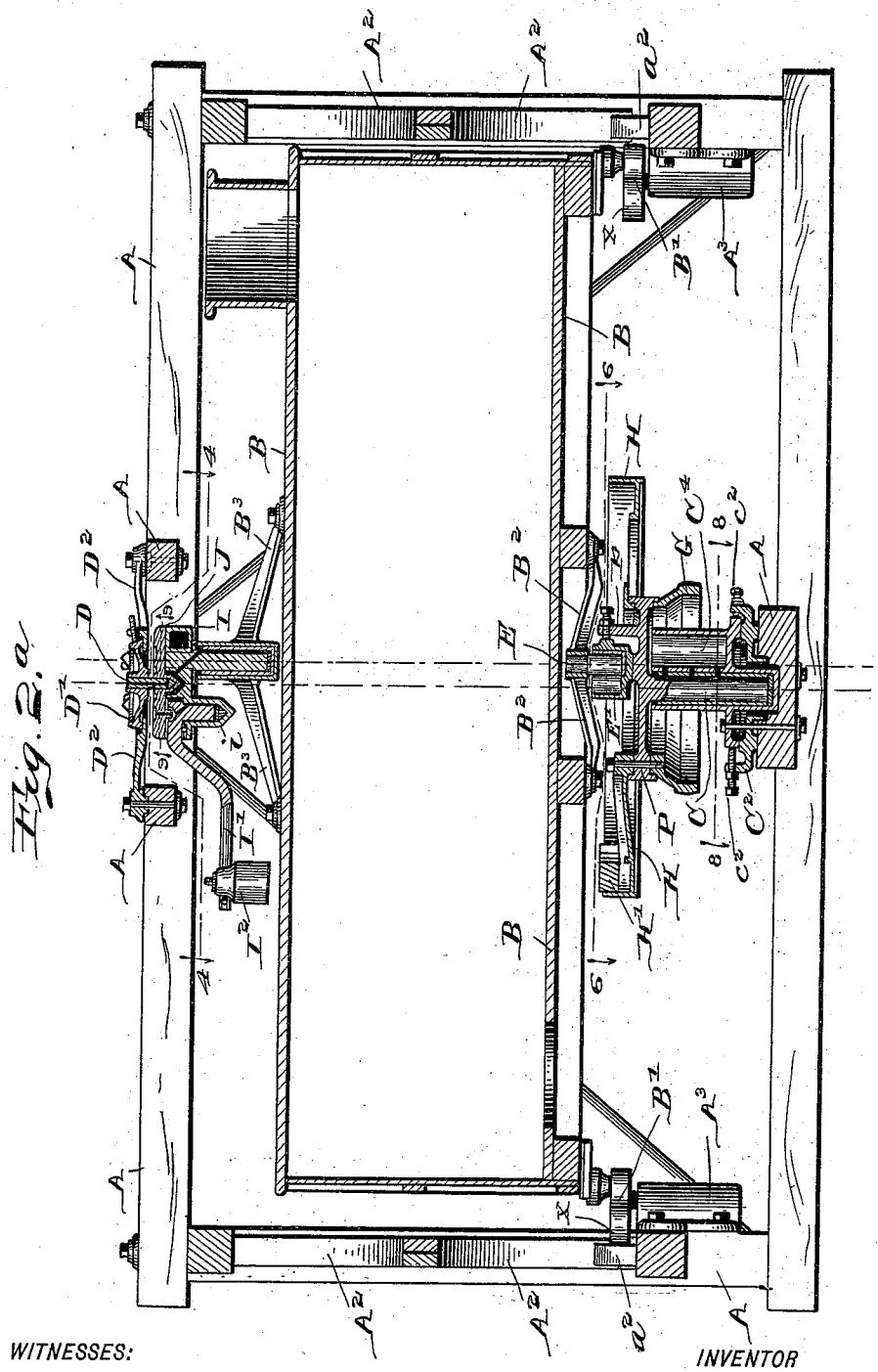
WITNESSES: INVENTOR
H. B. Nealy. Jesse Warrington,
J. A. Walsh. Chester Bradford,
ATTORNEY.

(No Model.)  
6 Sheets—Sheet 4.
J. WARRINGTON.
BALANCING MECHANISM.
No. 551,149. Patented Dec. 10, 1895.
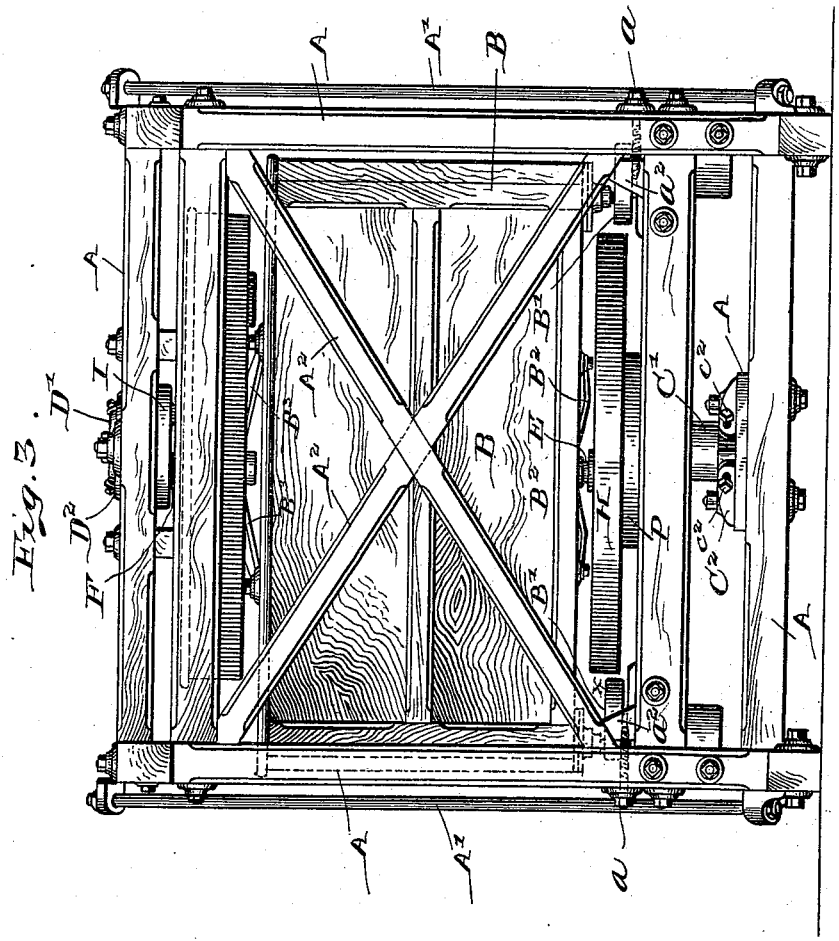
WITNESSES:
INVENTOR  
Jesse Warrington,  
BY Chester L. Bradford,  
ATTORNEY.

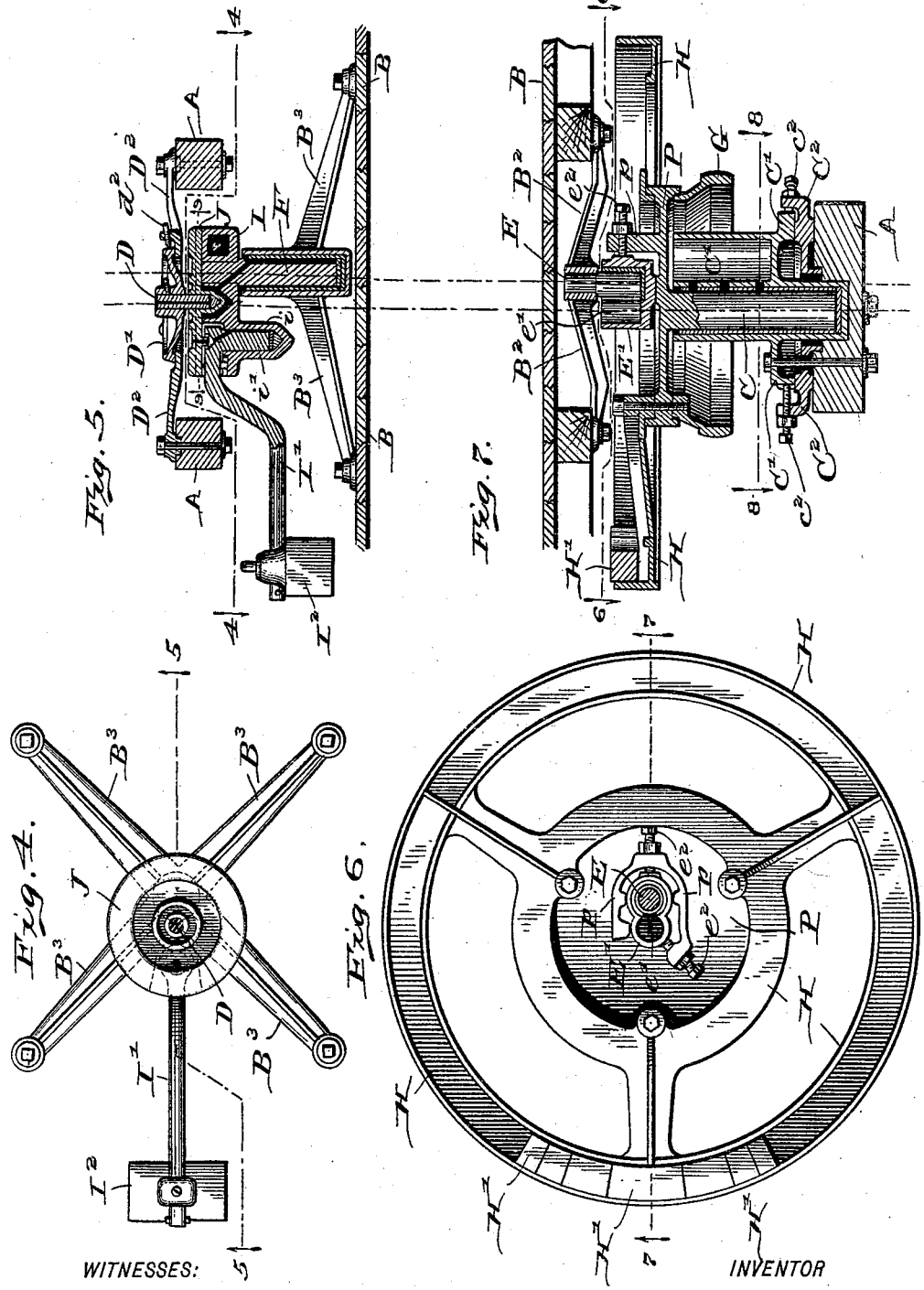

(No Model.)
J. WARRINGTON.
BALANCING MECHANISM.
No. 551,149. Patented Dec. 10, 1895.
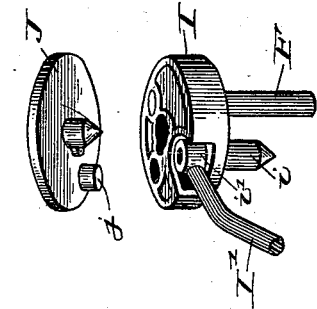
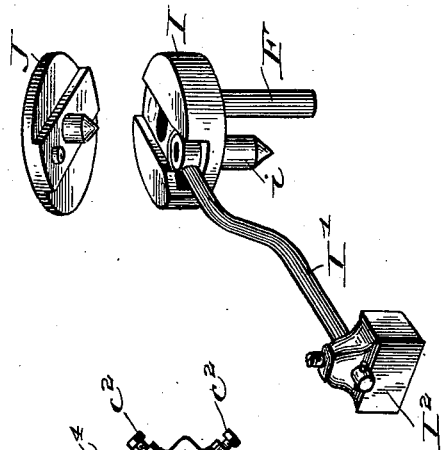
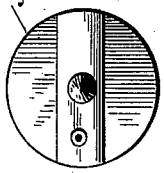
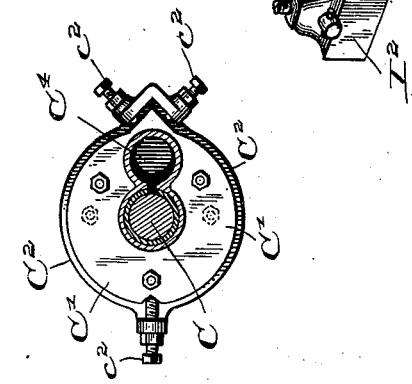
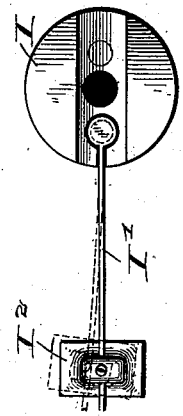
WITNESSES:
INVENTOR
Jesse Warrington,
BY Chester Bradford
ATTORNEY.

UNITED STATES PATENT OFFICE.

JESSE WARRINGTON, OF INDIANAPOLIS, INDIANA, ASSIGNOR OF ONE-HALF TO THE NORDYKE & MARMON COMPANY, OF SAME PLACE.

BALANCING MECHANISM.

SPECIFICATION forming part of Letters Patent No. 551,149, dated December 10, 1895.

Application filed July 31, 1895. Serial No. 557,765. (No model.)

*To all whom it may concern:*

Be it known that I, JESSE WARRINGTON, a citizen of the United States, residing at Indianapolis, in the county of Marion and State of Indiana, have invented certain new and useful Improvements in Balancing Mechanism, of which the following is a specification.

The principal object of my said invention is to produce a driving mechanism for a machine having a rotary shaking movement, by means of which the centrifugal force of such a machine may be effectually counteracted and the machine as a whole caused to run steadily, so that the frame thereof, or the structure upon which it is mounted, may be relieved of the severe strain incident to the usual operation of such machines.

This invention is applicable to many forms of machines; but I regard it as especially adapted to bolting or sieving machines, such as are used in flouring-mills. I will, therefore, show and describe said driving mechanism in connection with such a machine, after which the novel features thereof, and of the structure involved, will be specifically pointed out in the claims.

Referring to the accompanying drawings, which are made a part hereof, and on which similar letters of reference indicate similar parts, Figure 1 is a top or plan view of a machine provided with a driving mechanism embodying my said invention, one corner of the driven machine structure being broken away to show one of the supporting-cranks more plainly; Fig. 2, a side elevation of the same; Fig. 2ª, a longitudinal central vertical sectional view through the machine, the sieves or interior structure, however, being omitted; Fig. 3, an end elevation; Fig. 4, a plan view of that portion of the counterbalancing driving mechanism which, in the construction illustrated, is upon the upper side of the machine, as seen from the dotted line 4 4 in Fig. 5; Fig. 5, a vertical sectional view of the same as seen from the dotted line 5 5 in Fig. 4; Fig. 6, a plan view of the mechanism which, in the construction illustrated, is located on the under side of the machine driven thereby, as seen from the dotted line 6 6 in Fig. 7; Fig. 7, a vertical sectional view as seen from the dotted line 7 7 in Fig. 6; Fig. 8, a horizontal sectional view looking downwardly from the dotted line 8 8 in Fig. 7; Fig. 9, an under side plan view of the top plate of the upper mechanism, as seen from the dotted line 9 9 in Fig. 5; Fig. 10, a detail perspective view of said upper mechanism with the parts separated; Fig. 11, a view similar to Fig. 10, showing an alternative construction; Fig. 12, a plan view of the parts shown in the lower portion of Fig. 10, but showing an alternative construction of the weight-arm, in which said weight-arm is constructed in the form of a flat spring, which may operate instead of or as auxiliary to the pivot carrying said arm; and Figs. 13 and 14, a side elevation and vertical sectional view, respectively, of the lower carrying-cranks, as seen from the dotted lines 13 13 and 14 14, respectively, in Fig. 1.

In said drawings the portions marked A represent the framework upon which the bearings supporting the machine to be driven are mounted; B, the body of such a machine, hereinafter denominated the "driven structure;" C, the lower axis-pin; D, the upper axis-pin; E, a crank-pin, preferably the lower one, driven directly from the driving mechanism, and by which consequently the movement of the driven structure is primarily caused; F, the other (usually upper) crank-pin, by which the movement is caused to be equalized; G, a driving-pulley; H, a fly-wheel at the driven side of the machine, preferably the bottom; I, a crank-wheel on the opposite side, preferably the top; and J a bearing-plate for the axis-pin D, which rests upon the crank-wheel I, and which is capable of movement in one direction relatively to said crank-wheel.

As heretofore stated, the main or principal object of my said invention consists in providing means for effectually counteracting the centrifugal force of the driven structure, and thus relieving the framework or building from the stress of the force so produced. Fly-wheels and counterbalancing-weights are in themselves old for many purposes, but these as ordinarily applied are not effective to secure perfect or approximately perfect results.

In machines of the character shown it is also desirable to use axis-pins instead of a continuous shaft, as to pass a shaft through the structure of the machine interferes with the interior sifting or bolting mechanism and is therefore to be avoided. Counterbalancing-weights located wholly upon one side of the structure operate imperfectly, for the reason that when so located there is a continual tendency in that edge of the driven structure on the opposite side of the axis from the balance-weight to tilt downwardly, which cannot be effectually counteracted by weights positioned at one side only of such structure. The total weight employed should therefore be divided and a portion located upon each side, and to secure the most perfect results the two weights should be so proportioned that the center of gravity of said two weights will lie in the same plane as the center of gravity of the driven structure. This proportion, however, can be departed from in some degree without seriously affecting the operation, less exactness, practically, being required in this particular than in some others. It is also very difficult, and may be said to be practically impossible, to accurately independently center the separate axis-pins and crank-pins relatively to each other, and in order to secure an approximately correct relative positioning it is necessary that one axis-pin and crank-pin, preferably those on the opposite side of the driven structure, from the immediately driving mechanism, should be yieldingly mounted in relation to each other in one direction; and for this and other reasons it is necessary that the weight connected to the corresponding crank-wheel should be yieldingly mounted, which I prefer to do by providing a pivoted or yielding arm for such weight. I may say here that I have illustrated this feature (of a yieldingly-mounted weight attached to a crank-wheel) by showing a pivoted arm for the weight in several views in connection with the general illustration of the invention and by showing a flexible arm in Fig. 12. It is obvious, however, that the required yielding may be provided for in various other ways without departing from my invention; and I desire to be understood as intending to include within the scope of my claims relating thereto any yielding formation or attachment of these weights to the crank-wheel, whether by means of pivots, springs, or other devices, and whether by immediate or mediate means or construction.

The foregoing will be sufficient to show the general character of my invention. Any details of construction incident thereto or connected therewith will be mentioned in connection with the detailed description of the machine to which the invention has been applied.

The framework A, except in the particulars hereinafter stated, is not essentially novel, while, when the machine is in full operation, there is little or no strain upon this framework in starting, and before the mechanism has reached its operative position under full speed there is some strain, and, therefore, I prefer that the framework should be thoroughly braced. This I find can conveniently be done by providing the stay-rods $A'$ at the sides and the crossed braces $A^2$ at the ends. The latter, in themselves, are ordinary crossed braces halved together in the center, but the means of fastening them in place I believe to be novel and of especial advantage in a machine of this character, where convenient means of inserting and replacing the structure to be driven are desirable, if not imperative. Said braces rest loosely against the frame members at the upper corners of the framework and also at the lower ends of the braces. Below these lower ends, however, I provide wedges $a^2$, which are operated by draw-bolts $a$, which extend in through the frame A and enter screw-threaded perforations therein. By loosening these draw-bolts a trifle, the crossed braces $A^2$ are rendered loose and are easily removed, leaving the end of the frame open, so that the structure B can be readily taken out. When desired, the braces are simply put back in place and the bolts $a$ tightened up, which forces the braces back firmly into position and restores rigidity to the frame.

The body B or driven structure is, in the illustration shown, the body of a bolting or sifting machine of that class in which, while the structure maintains the same general position, a limited rotary motion is imparted thereto about a central point by means of a comparatively short crank. This structure is supported at the corners by loosely-mounted crank structures $B'$, which are supported in brackets $A^3$ on the frame A, into which the axis-pins $b'$ enter, while the crank-pins $b$ enter bearings in the under sides of the structure B at the corners. On the opposite side of the axis-pins $B'$ from the crank-pins $b$ these crank structures are preferably weighted or enlarged, as at $x$, as shown most plainly in Figs. 1 and 13, and these weight-like portions serve to some extent to counterbalance the dead weight of the structure B. Said structure B is driven by the crank-pin E on the shaft C, commonly by a belt running from some suitable source of power (not shown) to the belt-pulley G. So far, however, there is nothing novel in the operation, as a crank driving mechanism for sifting or bolting machines of this character of a simple form is well known.

The parts C, G, and H, in my preferred construction, as shown most plainly in Fig. 7, while constructed separately for convenience, are preferably rigidly secured together and practically integral in operation. The axis-pin C is formed integrally with or attached rigidly to a plate P, and is mounted on a step-bearing $C'$, which in turn is carried by a supporting-plate $C^2$, which latter is secured to a cross-bar forming a part of the frame A. In order to facilitate easy adjustment of the parts, the bearing $C^3$ is adjustable upon the plate $C^2$, the adjustment being effected by set-screws $c^2$, as shown most plainly in Figs.

2 and 7. There are preferably three of these set-screws, so that the adjustment may be made in any desired direction. A lubrication-cup $C^4$ is provided in the bearing $C^3$ alongside the axis-pin C, in which a lubricant is placed. As the pull on this axis-pin is almost wholly on one side of the bearing, there may be a slit leading from the lubrication-cup $C^4$ to said axis-pin throughout its entire length, or there may be perforations, as shown in Fig. 7, for the free admission of the lubricant thereto.

The upper axis-pin D should be precisely in line with the axis-pin C. It is carried by the plate D' resting in the spider $D^2$, which latter is secured to cross-bars forming part of the frame A. As shown in Figs. 1 and 5, set-screws $d^2$ are provided, by which the plate D' may be adjusted from the spider $D^2$, and, as before, there should be three of these set-screws, so that the adjustment can be made in any desired direction. Lubrication for this axis-pin D is provided by a cavity in the upper end of the pin itself, with a longitudinal perforation leading downwardly therefrom and one or more transverse perforations leading out from the lower end of the vertical perforation through which a lubricant may be introduced, as shown in Fig. 5, and as will be readily understood. This axis-pin enters a suitable bearing in the automatically-adjustable plate J on the crank-wheel I.

The axis-pins C and D together form in effect a shaft.

The crank-pin E is driven, by the means described, from the axis or shaft pin C, and its upper end enters a bearing in the spider $B^2$, secured to the floor or frame of the structure B. The crank-pin holder E' is situated between the sides of an upwardly-projecting flange $p$, forming part of the structure carried by the axis or shaft pin C, and rests against finished surfaces or spots on one side, while it is operated against by the set-screws $e^2$ on two other sides, so that it, like the other parts, is readily adjustable, as may be desired. A third set-screw might be used, but this I have found unnecessary in practice with this part, and I prefer two therefore, as shown most plainly in Fig. 6. The lubrication for this pin is provided by means of a cup $e'$, formed in the structure E' alongside said pin, as shown most plainly in Figs. 6 and 7. Obviously so long as this cup remains filled the pin will be thoroughly lubricated. Preferably the pin itself is rigidly attached to the bracket $B^2$, while its bearing is in the part E'; but obviously this construction may be reversed, if desired. There is an open space shown between the lubricant-cup and the crank-pin. This is permissible because the centrifugal force always causes the bearing or pull to be against the side of the pin which is opposite to this lubricant-cup.

The crank-pin F is mounted in a suitable bearing provided therefor in the spider $B^3$, attached to the top of the driven structure B, as shown most plainly in Fig. 5. As shown in said figure, a lubricant-cup is formed in the upper surface of the crank-wheel I, surrounding the socket into which the axis-pin D extends, and a channel is cut through the structure of the crank-pin to the other side thereof and communicates with a groove cut in its surface. By this means this pin is always thoroughly lubricated. The groove can be cut in the side opposite the weight, as shown, for the reason that the force always comes upon the other side of said pin because of the centrifugal action of the weight, which pulls in that direction.

The belt-pulley G, as heretofore stated, is rigidly connected to the same structure which embodies or carries the axis or shaft pin C, and is a preferred means whereby the movable structure is driven, as has heretofore been sufficiently explained.

The fly-wheel H, as already stated, is also rigidly attached to the structure of which the axis or shaft pin C also forms a part, the structure as a whole consisting of the pin C, the plate P, the pulley G, and this fly-wheel H. In that portion of the rim of said fly-wheel which is substantially on the diametrically-opposite side of the axis from the crank-pin E is placed a weight H', which is preferably composed of a group of parts, as shown, which obviously may be adjusted as desired by adding or removing parts, and which serves to counteract the centrifugal force of the driven structure. This weight H', combined with the weight $I^2$, exerts in operation a substantially equal force in one direction to that which is exerted by the driven structure in the other direction, although they are in themselves much lighter than said structure. This is due to the proportionally greater circle through which said weights travel, they being a much greater distance from the axis of rotation than are the cranks by which said structure is driven, and, therefore, of a correspondingly greater movement. To roughly illustrate, without taking friction and other minor elements of the problem into account: Suppose the driven structure has a weight of two hundred pounds; and suppose the distance from the axis to the center of gravity of these weights is ten times the distance from the axis to the center of the crank-pins. Manifestly the weights would exert a force against said crank-pins of ten times their own weight, and, therefore, need not be but one-tenth the weight of the driven structure to exert an equal force; or, if said structure weighs two hundred pounds, as stated, said weights need weigh but twenty pounds.

The crank-wheel I is guided by the axis-pin D, and engages with the moving structure B through the crank-pin F and spider $B^3$, as has already been explained, but said crank-wheel and said moving structure are, in operation, permitted a movement relatively to the axis-pin by means of a peculiar connection with the bearing-plate J (with which said axis-pin directly engages) and which movement is one of the most important features of my invention, as will be presently explained. An arm I' extends out on that side of the axis-pin which is diametrically opposite to the crank-pin F, and said arm carries a weight I² (at an adjusted point) at or near its outer end, corresponding substantially in position with the weights H' on the fly-wheel H. Practically the weight I² is about equal to the weights H'. Theoretically they should bear that proportion to each other which will bring the plane of their common center of gravity coincident with the plane of the center of gravity of the driven structure, and the nearer this exact proportion of weight to distance can be approximated, with, perhaps, some allowance for excess of friction in the lower portion of the driving mechanism, the more perfectly the apparatus will perform. The weight I² should be adjustable on the arm I', for the reason that it is difficult to so closely calculate these various weights and distances as that some adjustment is not desirable in ordinary use. The arm I' is shown in the principal views as hung loosely in a lubricated bearing $i$ extending vertically into and below the body of the crank-wheel I by means of a pivot or bearing pin I' extending into said bearing. This bearing is preferably lubricated by means similar to that described in connection with the crank-pin F, so that it shall move perfectly freely. Manifestly, therefore, this arm will swing on its pivot or bearing pin while the machine is being started and gotten under way, its final position being that attained when the regular speed of the machine is reached, and should anything interfere with the steady and uniform motion of the machine this arm and weight will also in such cases yield somewhat, thus avoiding sudden and severe strains on the mechanism which would otherwise result in such cases. The pull or force of this weight in operation is directly opposite to the pull or force exerted by the driven structure on the crank-wheel through the crank-pin, the effect of this and the other weight being, as already explained, to keep the machine "in balance" so far as centrifugal force is concerned, while the automatically-adjustable character of this weight provides for an automatic equalization of temporary disturbances or inexact adjustment.

In Fig. 12 I have illustrated a flexible arm, and, as elsewhere stated, other forms of yielding arms may be employed without departing from my invention or other means of carrying the yieldingly-mounted weight. My invention may be said briefly to consist in this particular of a weight so connected to a crank-wheel that it will yield in the plane of revolution, and thus be measurably free from the influence of any irregularity of motion that may be transmitted to the crank, or, in other words, my invention permits irregularity of motion in the crank while maintaining substantial regularity of motion of the weight.

The bearing-plate J, as has already been shown and described, contains the bearing for the axis-pin D, while the crank-wheel I contains the bearing for the wrist-pin F. Of course the crank-pin must travel around the axis and the weight must be maintained on substantially the opposite side of the axis from the crank-pin, so that but little, if any, movement is allowable in one direction, or, in other words, so far as the thrust of the crank-pin is concerned, the crank-wheel I and bearing-plate J should be in effect integral. Where separate axis-pins and crank-pins are used, however, it is a matter of great difficulty to secure perfect alignment between said axis-pins and between the attached cranks. This I have overcome by providing a free movement between the bearing-plate J and the crank-wheel I on a line leading through the centers of the axis, the crank-pin, and (in the principal construction shown) the weight-pivot. Such a sliding connection not only automatically equalizes any slight inaccuracy of relative positioning of the axis-pin and crank-pin, but is also of great assistance in the work of originally adjusting the apparatus, as I am enabled to find the proper relative positions by setting up these parts and slowly revolving the machine, when any discrepancy from correct alignment will be disclosed by the resulting sliding motion between these parts. I have provided for this sliding movement in two different ways, as is illustrated most plainly in Figs. 10 and 11. In Fig. 10 the theoretically-correct construction is illustrated, which consists in a groove in one part, with a corresponding slide on the other part, the sides being parallel to the line just stated, so that the movement of the crank-pin as governed by the movement of the lower structure is always directly toward or from the axis in the line leading toward the weight-arm pivot. In practice, however, this movement is extremely slight, scarcely exceeding an eighth of an inch in a full-sized operative machine, and so a more convenient and desirable construction is to secure the crank-wheel I and disk J together by means of a suitable perforation in one and a suitable pivot-pin $j$ in the other. Of course the movement with this construction is on an arc of a circle, but the arc is so short that it does not depart sufficiently from a straight line to cause any difference practically in the movement of the parts. As before stated, however, to be theoretically correct, the connection should be a slide, as shown in Fig. 10.

The operation of my said invention may be recapitulated as follows: The structure B, being mounted on the frame A by means of four crank structures B', one at each corner, is driven from the belt-pulley G, through the crank-pin E, about the axis or shaft pins C and D. The movement of the structure through the crank-pin F drives the crank-wheel I, with its attached weight I², also about the axis or shaft pin D. The fly-wheel, H being rigidly connected to the driving device, of course moves therewith, carrying the weights H'. As the speed increases, the arm I', carrying the weight I², attains a position approximately on a radial line from the axis of rotation, being impelled thereto by centrifugal force, and itself serves its part in counteracting the centrifugal force of the driven structure, as has already been explained. I have determined by actual practical test that a machine which, with a rigid construction, was impossible of successful operation, because of the jar and strain due to unequal application of force, is capable of running with almost absolute steadiness, and consequent trifling strain on the supporting-frame, by the application of my invention.

Having thus fully described my said invention, what I claim as new, and desire to secure by Letters Patent, is—

1. The combination, with a driven structure having a horizontal movement, of mechanism for driving the same embodying upper and lower crank wheels, the axis-pin and crank-pin at that side to which the driving force is applied being fixed relatively to each other in operation, and the axis-pin and crank-pin on the other side being yieldingly connected.

2. The combination, with a driven structure, of a shaft or axis-pin, bearings therefor carried by a suitable frame or supporting structure, crank-pins immediately connected to the driven structure, a weight disposed on the opposite side of the axis from one crank-pin and connected to the corresponding crank-wheel, and a sliding or yielding connection between said crank-wheel and the corresponding axis-pin bearing, whereby the positions of said axis-pin and said crank-pin are automatically adjusted to correspond with the positions of the other axis-pin and crank-pin, in operation.

3. The combination, with a driven structure having a horizontal movement, of axis-pins centrally located above and below said structure, bearings therefor carried by a suitable frame or supporting structure, crank-wheels connected thereto, and a weight connected to each crank-wheel at a point on the opposite side of the axis from the corresponding crank-pin, said two weights being so proportioned that their common center of gravity will be in approximately the same plane as the center of gravity of the driven structure.

4. The combination, of a driven structure, the shaft or axis-pin therefor, the crank-wheels, the cranks, and weights attached to the crank-wheels, that weight which is attached to the crank-wheel on the opposite side of the machine from where the driving force is applied thereto having a pivoted or yielding arm, one end of which is connected to the corresponding crank-wheel, and which carries said weight at the other end.

5. The combination of a driven structure, axis-pins therefor, crank-wheels, crank-pins, and weights attached to the crank-wheels, one of said weights being pivotally or yieldingly mounted, whereby irregularity of motion in the corresponding crank may be permitted while substantial regularity of motion in said weight is maintained, substantially as set forth.

6. The combination, with a driven structure having a horizontal rotary movement, of upper and lower axis-pins, and upper and lower crank-pins, and means for adjusting the several pins in relation to each other, substantially as set forth.

7. The combination, with a driven structure having a horizontal rotary movement, of axis-pins, and crank-pins, and means of lubrication for said pins consisting of cups or spaces formed on those sides of said pins which are opposite to the pull or force exerted thereon by the machinery in operation, substantially as shown and described.

8. The combination, with a driven structure having a horizontal rotary movement, of an axis-pin on one side of the structure carrying a belt pulley or other means of being driven, a crank-pin, a fly-wheel, a weight on said fly-wheel on the opposite side of the axis from the crank-pin, an axis-pin on the opposite side of the structure, a corresponding crank-pin, an adjustable weight on the opposite of the axis from said crank-pin, and means whereby the several parts may be adjusted as desired relatively to each other, substantially as set forth.

9. The combination, with a driven structure, and the mechanism for driving it, of a frame-work carrying said structure and said mechanism, crossed braces A² embodied in said frame-work, wedges $a^2$ for tightening and loosening said braces, and screws $a$ for operating said wedges, whereby the braces may be conveniently removed and replaced as the structure and its mechanism may need to be removed and replaced, substantially as shown and described.

In witness whereof I have hereunto set my hand and seal, at Indianapolis, Indiana, this 26th day of July, A. D. 1895.

JESSE WARRINGTON. [L. S.]

Witnesses:
CHESTER BRADFORD,
JAMES A. WALSH.